United States Patent
Fischer et al.

(10) Patent No.: US 9,623,827 B2
(45) Date of Patent: Apr. 18, 2017

(54) INSTRUMENT PANEL WITH AN AIRBAG FLAP

(71) Applicant: Lisa Draexlmaier GmbH, Vilsbiburg (DE)

(72) Inventors: Wolfgang Fischer, Dorfen (DE); Bernhard Huber, Eggenfelden (DE); Joachim Maierthaler, Obergangkofen (DE)

(73) Assignee: Lisa Draexlmaier GmbH, Vilsbiburg (DE)

( * ) Notice: Subject to any disclaimer, the term of this patent is extended or adjusted under 35 U.S.C. 154(b) by 30 days.

(21) Appl. No.: 13/847,913

(22) Filed: Mar. 20, 2013

(65) Prior Publication Data

US 2013/0249196 A1    Sep. 26, 2013

(30) Foreign Application Priority Data

Mar. 20, 2012  (DE) ........................ 10 2012 204 392

(51) Int. Cl.
*B60R 21/215*  (2011.01)
*B60R 21/205*  (2011.01)
*B60R 21/2165* (2011.01)
*B60R 21/16*   (2006.01)

(52) U.S. Cl.
CPC ........ *B60R 21/2165* (2013.01); *B60R 21/215* (2013.01); *B60R 21/205* (2013.01); *B60R 2021/161* (2013.01)

(58) Field of Classification Search
CPC ................................................. B60R 21/215

USPC ............................................. 280/728.3, 732
See application file for complete search history.

(56) References Cited

U.S. PATENT DOCUMENTS

| | | | |
|---|---|---|---|
| 4,893,833 A * | 1/1990 | DiSalvo et al. | 280/732 |
| 5,149,479 A * | 9/1992 | Nakajima | 264/163 |
| 5,288,103 A * | 2/1994 | Parker et al. | 280/728.3 |
| 5,344,183 A * | 9/1994 | Hersman et al. | 280/728.3 |
| 5,382,047 A * | 1/1995 | Gajewski | 280/728.3 |
| 5,527,574 A * | 6/1996 | Iannazzi et al. | 428/43 |
| 5,549,324 A * | 8/1996 | Labrie et al. | 280/728.3 |
| 5,580,651 A * | 12/1996 | Kerman | 428/318.4 |
| 5,845,929 A * | 12/1998 | Schlett et al. | 280/728.3 |
| 6,168,188 B1 | 1/2001 | Preisler et al. | |
| 6,453,535 B1* | 9/2002 | Nicholas | 29/413 |
| 6,726,239 B1* | 4/2004 | Teranishi et al. | 280/728.3 |

(Continued)

FOREIGN PATENT DOCUMENTS

| | | |
|---|---|---|
| DE | 199 30 382 A1 | 1/2000 |
| DE | 101 47 547 A1 | 4/2003 |

(Continued)

*Primary Examiner* — Barry Gooden, Jr.
(74) *Attorney, Agent, or Firm* — Finnegan, Henderson, Farabow, Garrett & Dunner LLP

(57) ABSTRACT

An interior part, such as an instrument panel, for vehicles, for example motor vehicles is disclosed. The interior part includes an injection-molded rigid carrier with a front side and rear side, at least one groove on the rear side of the carrier, along which the carrier can rupture in order to form an airbag flap. The groove base of the groove lies at a distance from the front side of the carrier. The groove is formed in the mold. The front and rear sides of the carrier have the shape of a closed outer skin. The carrier includes a foamed core at least in the region of the groove.

21 Claims, 1 Drawing Sheet

(56) References Cited

U.S. PATENT DOCUMENTS

| | | | |
|---|---|---|---|
| 6,726,240 B2* | 4/2004 | Riha | 280/728.3 |
| 6,753,057 B1* | 6/2004 | Gardner, Jr. | 428/43 |
| 7,001,549 B1 | 2/2006 | Stieler | |
| 7,055,850 B2 | 6/2006 | Freystedt | |
| 7,118,122 B2* | 10/2006 | Lee | 280/728.3 |
| 7,425,018 B2* | 9/2008 | Suwama et al. | 280/728.3 |
| 7,611,163 B2* | 11/2009 | Schweizer et al. | 280/728.3 |
| 8,567,814 B2* | 10/2013 | Crittenden | 280/728.3 |
| 8,613,994 B2* | 12/2013 | Buhring et al. | 428/159 |
| 2002/0135161 A1* | 9/2002 | Lamb et al. | 280/728.3 |
| 2003/0015860 A1* | 1/2003 | Shah et al. | 280/728.3 |
| 2004/0124613 A1* | 7/2004 | Cowelchuk | 280/728.2 |
| 2004/0164531 A1 | 8/2004 | Riha et al. | |
| 2005/0077707 A1* | 4/2005 | Lee | 280/728.3 |
| 2006/0125218 A1* | 6/2006 | Guth et al. | 280/732 |
| 2006/0173116 A1* | 8/2006 | Kreuzer | 524/445 |
| 2007/0052210 A1* | 3/2007 | Schweizer et al. | 280/728.3 |
| 2007/0228702 A1* | 10/2007 | Ono et al. | 280/730.2 |
| 2009/0273164 A1 | 11/2009 | Buehler et al. | |
| 2009/0278338 A1* | 11/2009 | Takahiro et al. | 280/728.3 |
| 2010/0207366 A1* | 8/2010 | Evans et al. | 280/728.3 |
| 2010/0219618 A1* | 9/2010 | Rick et al. | 280/728.3 |
| 2012/0139214 A1* | 6/2012 | Choi et al. | 280/728.3 |
| 2013/0249195 A1* | 9/2013 | Hagl | 280/728.3 |
| 2013/0270801 A1* | 10/2013 | Zhang | 280/728.3 |

FOREIGN PATENT DOCUMENTS

| | | |
|---|---|---|
| DE | 10 2006 016 724 A1 | 10/2007 |
| DE | 10 2008 033 584 A1 | 1/2010 |
| DE | 10 2009 048 893 A1 | 4/2011 |
| DE | 10 2010 062 606 A1 | 6/2012 |
| WO | WO 00/54952 | 9/2000 |
| WO | WO 2011/121026 | 10/2011 |

* cited by examiner

INSTRUMENT PANEL WITH AN AIRBAG FLAP

RELATED APPLICATIONS

Foreign priority benefits are claimed under 35 U.S.C. §119(a)-(d) or 35 U.S.C. §365(b) of German application number DE 10 2012 204 392.6, filed Mar. 20, 2012, which is hereby incorporated by reference in its entirety.

BACKGROUND

I. Field

Aspects relate to an interior part, such as an instrument panel, for vehicles, and in particular to an airbag flap formed in an injection-molded rigid carrier having at least one groove provided thereon.

II. Discussion of the Related Art

It is known that grooves that do not completely penetrate a carrier can be formed after the production of the carrier in an injection mold and after the removal of the carrier from the injection mold. An airbag cover formed in a groove that does not completely penetrate the carrier is described, by way of example, in DE 10 2009 048 893 A1. It is also known that grooves that completely penetrate the carrier can be formed in a mold. An airbag flap formed in this manner is described, by way of example, in US-A-2004/0164531. Unfortunately, grooves that completely penetrate the carrier are not desirable since the grooves lead to sagging of the haptic and/or decorative layers arranged thereabove, such that that the grooves can become visible when in the installed state. Further, a weakening of the residual wall thickness of the carrier, such as when a groove whose groove base terminates at a distance from the front side of the carrier, which was introduced in a later additional process step, adversely affects the production time and thus the costs of the part.

SUMMARY

According to one embodiment, an interior part for vehicles is disclosed. The interior part includes an injection-molded rigid carrier with a front side and a rear side, and at least one groove on the rear side of the carrier, along which the carrier can fracture in order to form an airbag flap. The groove base of the groove lies at a distance from the front side of the carrier. The groove is formed in a mold. The front and rear sides of the carrier have a shape of a closed outer skin. The carrier includes a foamed core at least in the region of the groove.

In another embodiment, an interior part for vehicles is disclosed. The interior part includes a rigid carrier with a front side and a rear side, and at least one groove on the rear side of the carrier, the groove being molded in the rigid carrier and the groove having a groove base that lies a distance from the front side of the carrier.

It should be appreciated that the foregoing concepts, and additional concepts discussed below, may be arranged in any suitable combination, as the present disclosure is not limited in this respect.

The foregoing and other aspects, embodiments, and features of the present teachings can be more fully understood from the following description in conjunction with the accompanying drawings.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
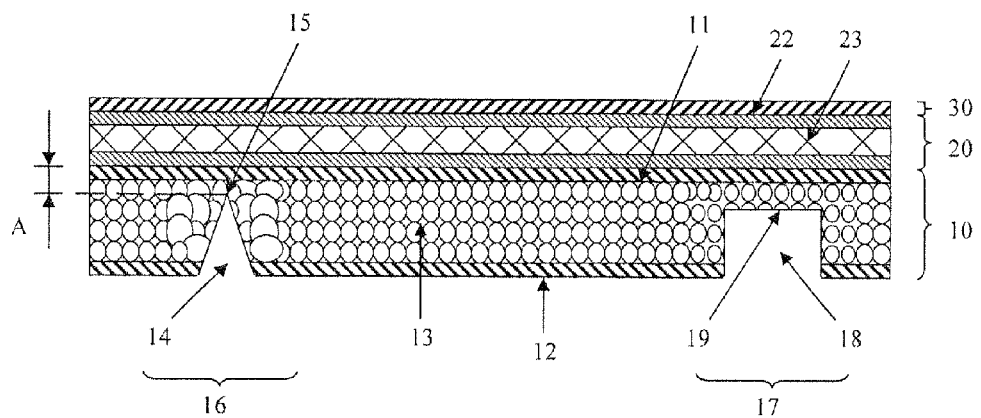
FIG. 1 is a cross-sectional view of an interior part according to one embodiment.

Embodiments relate to an interior part having a groove for the formation of an airbag flap such that the groove can remain invisible in the installed state and can have reduced production time and costs.

Without being limited by theory, embodiments are based on the idea that forming the interior part at least in the region of the groove provided for the formation of the airbag flap from a comparatively stiff but porous material, may positively influence the rupture behavior of the carrier for the formation of the airbag flap. In addition, the residual wall thickness, that is, the distance between the groove base and the front side of the carrier, can be dimensioned larger such that a sufficient and reliable rupture behavior may be achieved. Furthermore, due to the associated improvement in the wall thickness/rib ratio, it is possible to form the groove during the injection molding of the carrier so that later processing steps can be omitted and the costs thereby reduced. This may be advantageously assisted by using a thermoplastic foam casting method, in which the wall thickness/rib ratios may be larger than in the compact injection molding process.

According to one aspect, an interior part, such as an instrument panel, for vehicles and in particular motor vehicles is disclosed. A person of skill in the art should appreciate, though, that the interior part may be a part other than the instrument panel. In some embodiments, the interior part includes an injection-molded rigid carrier with a front side and a rear side. The carrier may be a plastic carrier made of polypropylene (PP), ABS (acrylonitrile-butadiene-styrene) or other suitable thermoplastic. In some embodiments, the carrier is a thermoplastic foam casting, for example a part produced in the TFC method. In this connection, the carrier may be produced in a physical or chemical thermoplastic foam casting method. The physical thermoplastic foam casting method, in which a gas is introduced into the plastic melt during the injection molding, is employed in some embodiments since the controllability of the production is better compared to the chemical foam casting method, in which the gas is already contained in the plastics granules. In some embodiments, the process reliability is improved by using the physical thermoplastic foam casting method. The physical thermoplastic foam casting method also may include introducing nitrogen or carbon dioxide into the melt, such as the process under the brand name MuCell®, available from Trexel, Inc., of Wilmington, Mass. USA. In some embodiments, the use of a thermoplastic foam casting methods is a possible way to configure the carrier with a closed outer skin on the front and rear sides, and with a foamed core at least over some areas. In this connection, the foamed core may be microcellular, in other words the core may contain individual cells that are in the micrometer range. A thermoplastic foam casting method is described, by way of example, in WO 00/54952. Suitable devices may be obtained, for example, from Trexel, Inc., of Wilmington, Mass., USA.

In one embodiment, at least one groove is provided on the rear side of the carrier, along which the carrier can rupture in order to form an airbag flap when the airbag unfolds. The groove may have various conventional shapes, for example a U-shape or a H-shape. A rectilinear groove also may be feasible for forming a so called fishmouth-shaped airbag flap, which is described, by way of example, in DE 10 2006 016 724 or DE 101 47 547 A1.

In some embodiments, the groove does not penetrate the carrier completely. Rather, the groove base of the groove may lie at a distance from the front side of the carrier so that the front side of the carrier is completely closed in this region. In some embodiments, a distance between about 0.2 mm and about 2 mm, or a distance between about 0.5 mm and about 1.5 mm, may be realized. The thickness of the carrier in this region may be about 2.5 mm and less in some embodiments, although other suitable carrier thicknesses may be used. The width of the groove may be between about 1 mm and about 20 mm, but also may be larger. Furthermore, in some embodiments, the groove also may be incorporated in the mold. For purposes herein, "incorporated in the mold" means that the injection molded part, in other words the carrier, includes a groove in the finished state from the injection mold and in particular does not have to be subsequently machined. In some embodiments, the carrier can be provided at least in the region of the groove with the aforementioned foamed core. By forming the carrier with the foamed core in the region of the groove, it may be possible to influence the notch impact strength and elongation at break of the carrier so that the material ruptures more easily in the region of the groove. Accordingly, in some embodiments, the groove does not have to be made so deep in the carrier as is normally the case in compact injection molding. In other words, the distance between the groove base and the front side of the carrier may remain relatively large. In some embodiments, the wall thickness/rib ratio may be positively influenced and the groove may be formed in the mold. In some embodiments, the foamed core, and in particular the use of a thermoplastic foam casting method, may permit larger wall thickness/rib ratios. The complicated and costly post-machining and later introduction of the groove also may be omitted if the groove does not completely penetrate the carrier.

In some embodiment, an advantageous fracture behavior is obtained if the carrier is reinforced with carbon fibres and/or contains graphene-like nanoadditives. Without being limited by theory, it is assumed that this is due to the fact that, compared to the hitherto used glass fibres, there are no or fewer "bunchings" and the carbon fibres and/or graphene-like substance are alignable in a plane, thereby producing a cleaner break particularly in conjunction with the foamed core. In addition, when joining the carrier to one or more layers on the front side using a heat-activated adhesive, it may be advantageous to use carbon fibres and/or graphene-like nanoadditives, since these are heated by microwaves and can thus heat the carrier, so as to activate the adhesive layer when laminating overlying haptic and/or decorative layers.

In some embodiments, it may be advantageous to divide the foamed core of the carrier between the front and rear sides into regions of different density. In some embodiments, the region in which the groove lies has a lower density than in the other regions. In this way, the regions of the carrier that should be particularly rupturable and the regions of the carrier that can and/or must have an increased rigidity and/or strength can be adjusted. In some embodiments, the density in the region of the groove is between about 8% and about 22% less than in the other regions.

In other embodiments, a hinge region may be provided in the carrier, on which the airbag flap is hingedly held when swiveling on the carrier. In some embodiments, the density in the hinge region may be higher than in the region of the groove and/or higher than in other regions, so as to avoid the airbag flap tearing when it swivels. Alternatively or in addition to, it also may be possible to cast a reinforcing layer, for example in the form of a network, into the carrier near the region of the hinge.

Without being limited by theory, it is known to weld or bond a so-called blast channel to the rear side, which channels the airbag when it unfolds in the direction of the airbag flap and its rear side. According to one embodiment, a blast channel is integrally formed, in other words, the blast channel is formed in one piece or as part of the material with the carrier. In one embodiment, the blast channel is formed in the injection molding process. This also may be possible due to the configuration of the carrier with closed outer skins and foamed core, and in particular when using the thermoplastic foam casting method, since the necessary wall thickness/rib ratios which have to be maintained when joining the blast channel to the rear side of the carrier may be realized in this way.

In some embodiment, the groove is formed with a V-shaped cross-section with the tip pointing towards the front side, since a more selective fracture behavior can be realized with this cross-section.

In other embodiments, a decorative layer and/or haptic layer is applied to the carrier. In some embodiments, the decorative layer and/or the haptic layer are unweakened in the region of the groove. Unweakened decorative and/or haptic layers are described, by way of example, in DE 10 2010 062 606 or DE 10 2008 033 584 A1. This construction may be obtained by any suitable arrangement and the interior part with an attractive appearance and integrated airbag flap may be achieved without separate process steps involving the incorporation of weaknesses in the carrier, decorative or haptic layer.

Turning now to the figures, FIG. 1 shows a three-layer structure with a carrier 10, a haptic layer 20, and a decorative layer 30. In some embodiment, the haptic layer is in the form of a spacer fabric material. In some embodiments, the decorative layer 30 can include real leather, artificial leather or other known decorative material as this aspect of the disclosure is not limiting. Although three layers are shown in this embodiment, it should be appreciated that more or less layers could be used in other embodiments.

In some embodiments, the carrier 10 is rigid. The carrier 10 may be injection-molded using the MuCell® method in some embodiments, although the carrier 10 may be formed using other methods as this aspect of the disclosure is not limiting. In some embodiments, the carrier 10 is made of polypropylene, although other suitable carrier 10 material may be used.

As seen in FIG. 1, in some embodiments, the carrier 10 has a front side 11 and a rear side 12. The front and rear sides 11, 12 may be formed as closed outer skins. In some embodiments, the carrier 10 comprises a microcellular foamed core 13. In some embodiments, the microcellular foamed core 13 is positioned between the front side 11 and the rear side 12 of the carrier 10.

In some embodiments, the carrier 10 includes a groove 14. The groove 14 may be formed in the rear side 12 of the carrier 10 and, in some embodiments, the groove may be formed inwardly from the rear side 12 of the carrier 10. In some embodiments, the groove 14 has a groove base 15. The groove base 15 may terminate at a distance A from the front side 11 of the carrier. As shown in FIG. 1, the groove 14 does not completely penetrate the carrier 10. In some embodiments, the groove 14 has a V-shaped cross-section, although other cross-section shapes may be used in other embodiments. As seen in FIG. 1, in some embodiments, the groove has a tip that forms the groove base 15 and faces towards the front side 11 of the carrier 10.

Figure 2:
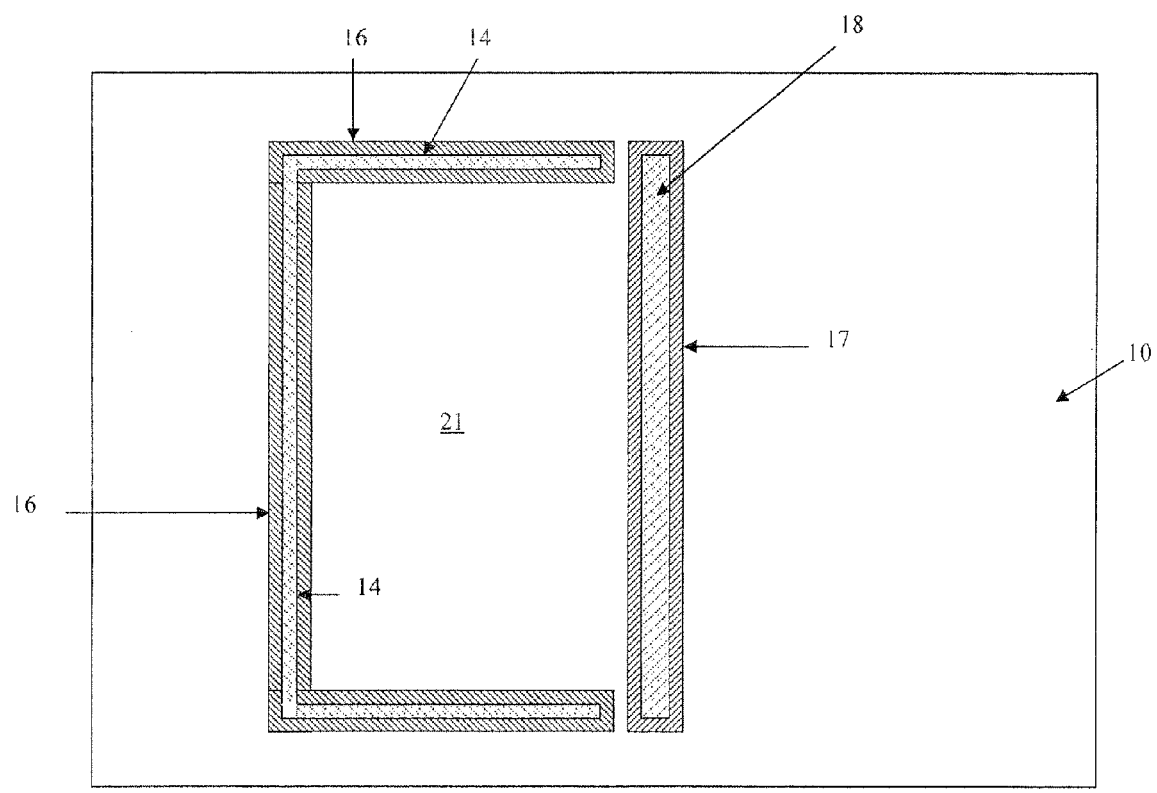
FIG. 2 is a schematic plan view of an interior part according to one embodiment.

In some embodiments, the foamed core 13 of the carrier 10 comprises a first region with a first density 16 and a second region 17 with a second density. The first and second regions 16, 17 are shown in an illustrative embodiment in FIG. 2, in which the groove 14, a hinge region 18, as well as regions of different density are schematically illustrated. In some embodiments, the groove 14 is located in the first region. It should be appreciated, though, that the groove 14 may be located in another region of the foamed core 13 in other embodiments. As shown in FIG. 1, the second region 17 may include a hinge region 18. In some embodiments, the hinge region 18 is configured in the form of a rectangular groove, although other suitable groove shapes may be used. The hinge region 18 also may be formed in the mold. In some embodiments, the hinge region 18 includes a groove base 19. The groove base 19 may terminate at a distance from the front side 11 of the carrier 10, i.e. does not completely penetrate the carrier 10.

As seen in FIG. 1, the groove 14 and the hinge region 18 define an airbag flap 21 in some embodiments. A reinforcing layer (not shown), may be provided between the groove base 19 and the front side 11 of the carrier 10 to further strengthen the hinge region 18. In some embodiments, the reinforcing layer includes a network extending from the airbag flap 21 via the hinge region 18 into the remaining part of the carrier 10.

In some embodiments, the first density of the first region 16 of the foamed core 13 has a lower value than the second density of the second region 17 and the density of the remaining regions of the foamed core 13. The carrier 10 in the first region 16 may be more porous and consequently may be influenced with regard to its notch impact strength and elongation at break such that the first region 16 fractures more easily. In some embodiments, the density in the second region 17 is higher when compared to the density of the first region 16 and the remaining regions of the foamed core 13, such that the hinge region, that is the groove 18, is strengthened. In the remaining regions, the density may be equal to or greater or less than the second density, depending on the strength requirements.

In some embodiments, the carrier 10 is reinforced with carbon fibres and/or contains graphene-like substances. In the illustrated embodiment shown in FIG. 1, the carrier 10 has a thickness of about 2.5 mm. It should be appreciated that the carrier 10 may have other suitable thicknesses in other embodiments. In some embodiments, the residual wall thickness A is about 0.5 mm, although the residual wall may have other thicknesses as this disclosure is not limiting.

In some embodiments, the haptic layer 20 has an upper and lower covering layer 22. In in some embodiments, the upper and lower covering layer 22 are jointed via pile threads 23. The haptic layer 20 may, for example, be a haptic layer as is described in DE 10 2010 062 606 A1 or DE 10 2008 033 584 A1. In some embodiments, the haptic layer 20 as well as the decorative layer 30 may have no subsequently introduced weakness in the region of the groove 14, that is the first region 16. An additional weakness may be necessary in other embodiments, depending on the material used for the decoration. Other suitable materials for the haptic layer 20 and decorative layer 30 also may be used, as this aspect of the disclosure is not limited in this regard.

While the present teachings have been described in conjunction with various embodiments and examples, it is not intended that the present teachings be limited to such embodiments or examples. On the contrary, the present teachings encompass various alternatives, modifications, and equivalents, as will be appreciated by those of skill in the art. Accordingly, the foregoing description and drawings are by way of example only.

What is claimed is:

1. An injection-molded carrier part for a vehicle, wherein the carrier part is configured to fracture when an airbag of the vehicle unfolds, the carrier part comprising:
   a front side and a rear side, wherein the rear side is configured to face the airbag; and
   a plurality of grooves having at least a first groove and a second groove on the rear side of the carrier part, along which the carrier part is configured to fracture to form an air bag flap, wherein:
      the plurality of grooves extend inward from the rear side toward the front side of the carrier part, and
      a groove base of each of the plurality of grooves terminates at a distance from the front side of the carrier part; and
   a foamed core between the front side and the rear side, where the foamed core is located at least in a region of the plurality of grooves, wherein the foamed core further includes regions of different densities, wherein:
      a first region includes an outer boundary having:
         a first region width defined by a cross-sectional width of the first groove, wherein the cross-sectional width of the first groove extends in a direction along the rear side of the carrier part, wherein the first region width is constant in a direction extending linearly towards the front side of the carrier;
      a second region includes an outer boundary having:
         a second region width defined by a cross-sectional width of the second groove, wherein the cross-sectional width of the second groove extends in a direction along the rear side of the carrier part, wherein the second region width is constant in a direction extending linearly towards the front side of the carrier;
      a density of the first region is lower than a density of a region surrounding and adjacent to the first region;
      a density of the second region is higher than a density of a region surrounding and adjacent to the second region; and
      the density of the first region is lower than the density of the second region.

2. The carrier part of claim 1, wherein the density of the first region is between about 8% and about 22% less than the density of the respective surrounding region.

3. The carrier part of claim 1, wherein the second region includes a hinge region for holding the air bag flap, wherein the hinge region enables the air bag flap to swivel on the carrier part.

4. The carrier part of claim 1, wherein the distance of the groove base from the front side of the carrier part is between about 0.2 mm and about 2 mm.

5. The carrier part of claim 1, wherein the carrier part is part of an instrument panel of the vehicle.

6. The carrier part of claim 1, wherein the carrier part is reinforced with at least one of carbon fibres and graphene nanoadditives.

7. The carrier part of claim 1, wherein the region surrounding the first region is adjacent the first region and the region surrounding the second region is adjacent the second region.

8. The carrier part of claim 1, further comprising:
a blast channel connected to the rear side of the carrier part for channeling the air bag in the direction of the air bag flap.

9. The carrier part of claim 8, wherein the blast channel is formed integrally with the carrier part.

10. The carrier part of claim 1, wherein a cross-sectional shape of the first groove is different than a cross-sectional shape of the second groove.

11. The carrier part of claim 10, wherein the first groove has a V-shaped cross-section.

12. The carrier part of claim 10, wherein the second groove has a rectangular cross-section.

13. An injection-molded carrier part for a vehicle, wherein the carrier part is configured to fracture when an airbag of the vehicle unfolds, the carrier part comprising:
a front side and a rear side, wherein the rear side is configured to face the airbag;
a plurality of grooves having at least a first groove and a second groove on the rear side of the carrier part, along which the carrier part is configured to fracture to form an air bag flap, wherein:
a depth of the plurality of grooves extends inward from the rear side toward the front side of the carrier part, and
a groove base of each of the plurality of grooves terminates at a distance from the front side of the carrier part; and
a foamed core between the front side and the rear side, where the foamed core is located at least in a region of the plurality of grooves, where the foamed core further includes regions of different densities, and wherein:
a first region having a dimension consisting of a cross-sectional width of a single groove of the plurality of grooves, the single groove being the first groove, wherein the first region width is constant in a direction extending linearly towards the front side of the carrier,
a second region having a dimension consisting of a cross-sectional width of a single groove of the plurality of grooves, the single groove being the second groove, wherein the second region width is constant in a direction extending linearly towards the front side of the carrier,
a density of the first region is lower than a density of a region surrounding and adjacent the first region,
a density of the second region is higher than a density of a region surrounding and adjacent the second region, and
the density of the first region is lower than the density of the second region.

14. The carrier part of claim 13, wherein the density of the first region is between about 8% and about 22% less than the density of the respective surrounding region.

15. The carrier part of claim 13, wherein the second region includes a hinge region for holding the air bag flap, wherein the hinge region enables the air bag flap to swivel on the carrier part.

16. The carrier part of claim 13, further comprising:
a blast channel connected to the rear side of the carrier part for channeling the air bag in the direction of the air bag flap, wherein the blast channel is formed integrally with the carrier part.

17. The carrier part of claim 13, wherein a cross-sectional shape of the first groove is different than a cross-sectional shape of the second groove.

18. The carrier part of claim 17, wherein the first groove has a V-shaped cross-section.

19. The carrier part of claim 17, wherein the second groove has a rectangular cross-section.

20. An injection-molded carrier part for a vehicle, wherein the carrier part is configured to fracture when an airbag of the vehicle unfolds, the carrier part comprising:
a front side and a rear side, wherein the rear side is configured to face the airbag;
a plurality of grooves having at least a first groove and a second groove on the rear side of the carrier part, along which the carrier part is configured to fracture to form an air bag flap, wherein:
the plurality of grooves extend inward from the rear side toward the front side of the carrier part, and
a groove base of each of the plurality of grooves terminates at a distance from the front side of the carrier part;
a foamed core between the front side and the rear side, where the foamed core is located at least in a region of the plurality of grooves, where the foamed core has foam material with regions of foam material of different densities, and wherein:
a cross-sectional width of the first groove, extending in a direction along the rear side of the carrier part, defines an outer boundary of a first region, wherein the first region width is constant in a direction extending linearly towards the front side of the carrier,
a cross-sectional width of the second groove, extending in a direction along the rear side of the carrier part, defines an outer boundary of a second region, wherein the second region width is constant in a direction extending linearly towards the front side of the carrier,
a density of the foam material of the first region is lower than a density of the foam material of a region surrounding and adjacent to the first region,
a density of the foam material of the second region is higher than a density of the foam material of a region surrounding and adjacent to the second region, and
the density of the first region is lower than the density of the second region.

21. The carrier part of claim 20, wherein the density of the first region is between about 8% and about 22% less than the density of the respective surrounding region.

* * * * *